(No Model.)

2 Sheets—Sheet 1.

H. FONDERSMITH.
CONDUIT FOR ELECTRIC CONDUCTORS.

No. 344,732. Patented June 29, 1886.

(No Model.)   H. FONDERSMITH.   2 Sheets—Sheet 2.
CONDUIT FOR ELECTRIC CONDUCTORS.

No. 344,732.　　　　　　　　Patented June 29, 1886.

UNITED STATES PATENT OFFICE.

HENDERSON FONDERSMITH, OF PHILADELPHIA, PENNSYLVANIA, ASSIGNOR OF ONE-HALF TO J. CHESTER WILSON, OF SAME PLACE.

CONDUIT FOR ELECTRIC CONDUCTORS.

SPECIFICATION forming part of Letters Patent No. 344,732, dated June 29, 1886.

Application filed August 13, 1885. Serial No. 174,238. (No model.)

*To all whom it may concern:*

Be it known that I, HENDERSON FONDERSMITH, a citizen of the United States, residing in Philadelphia, Pennsylvania, have invented a certain Improved Conduit for Electric Conductors, of which the following is a specification.

My invention consists of an improved conduit for electrical conductors, as more fully described hereinafter.

Figure 1:
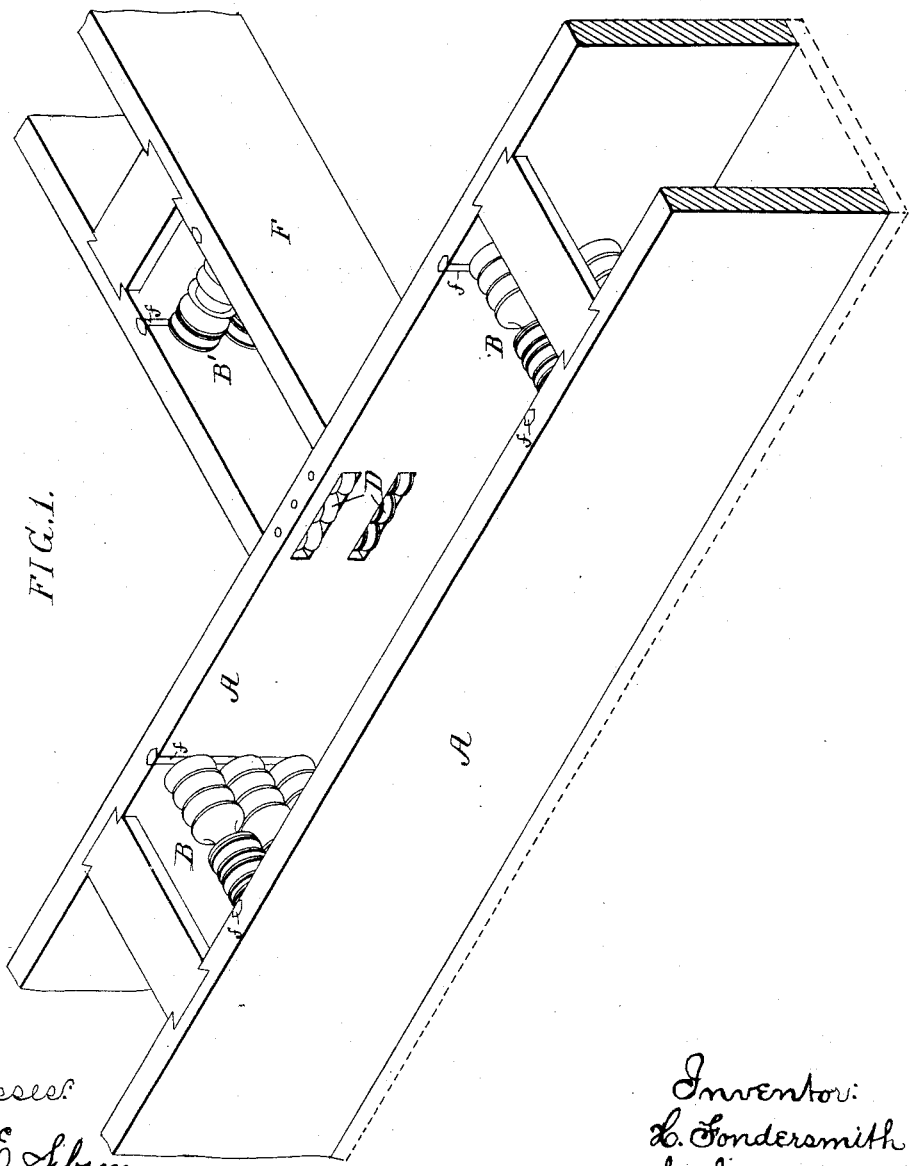
Figure 2:
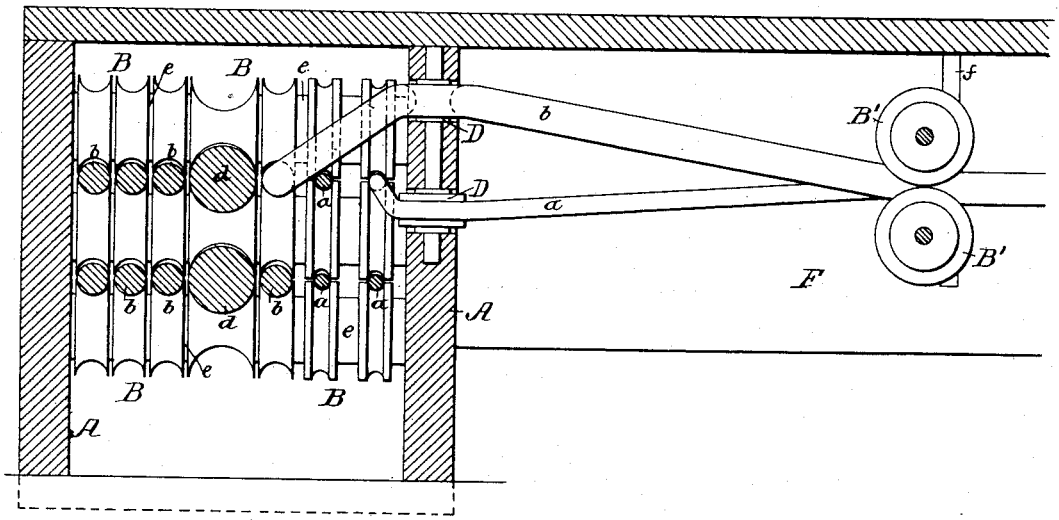
Figure 3:
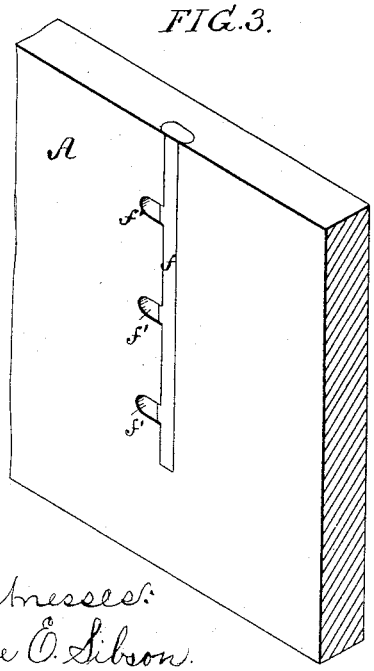
Figure 4:
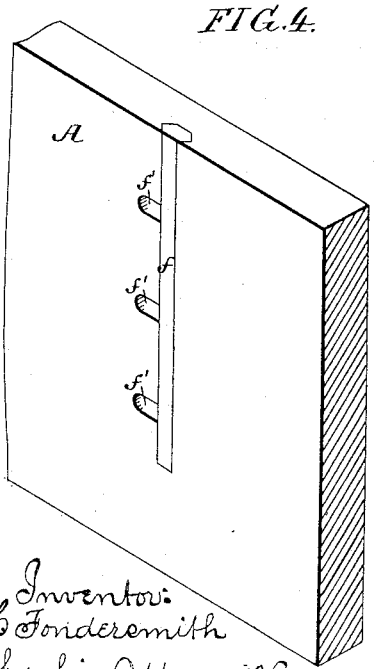

In the accompanying drawings, Figure 1 is a perspective view of sufficient of the conduit to illustrate my invention. Fig. 2 is a vertical section drawn to an enlarged scale; and Figs. 3 and 4 are detached perspective views illustrating one of the features of my invention.

My improvement is designed for application either under or above the surface of the ground, or in tunnels, or to be applied in the superstructure of bridges, or against walls, or in any situation where electrical conductors are adapted to be supported.

My invention consists, essentially, of a frame, A, which may be of the box-like form illustrated in the drawings, and in which are mounted axles carrying pulleys B, having grooves, and two or more of these axles being arranged adjacent to each other, so that the grooved pulleys of one will lie in close proximity to the grooved pulleys of the other. The grooves in the adjacent pulleys are of such a character that together they will form a circular or nearly-circular opening for the introduction and passage through it of an electrical conductor or cable, which will be confined thereby and prevented from being turned laterally out of position, while at the same time facilitating the longitudinal movement of the conductors for the stretching of the wires or their passage through the conduit.

I prefer to form the grooves of the pulleys of different sizes, for the accommodation of different characters of wires. In Fig. 2, for instance, *a a* may be taken to represent insulated electric-light conductors; *b b*, cables for telephonic wires, while *d* are cables of telegraphic wires.

F represents a branch conduit, which is provided with adjacent sets of grooved pulleys B', similar to those in the main conduit, but at the point of passage from the main to the branch conduit rollers or grooved pulleys D are provided, preferably on vertical axes, as shown in Figs. 1 and 2, for confining, guiding, and supporting the wires as they pass from the main conduit to the branch, and these grooved pulleys are of varying sizes for the different characters of conductors or cables, as illustrated in Fig. 2.

The grooved pulleys I prefer to form of some insulating material—such as wood, rubber, porcelain, or other material—and I prefer to arrange on the adjacent shafts those pulleys which are of corresponding size adjacent to each other, as shown in the drawings, although this is not essential. It will be seen that the grooved pulleys thus arranged adjacent to each other form guides not only for supporting and conveying the conductors or cables, but also for confining and guiding them where the conduits turn curves or corners or change their grade, or where the conductors or cables are led off through branches from the main conduit.

In order to reduce the friction between the adjacent grooved pulleys on the same shaft, washers *e* may be interposed between them, or hubs or bosses may be formed on the pulleys on one or both sides. The shafts of the pulleys are arranged at such distances apart on the frame A as to afford the necessary support for the wires without undue sagging between the pulleys.

As I have said, my improved conduit may be applied either underground or overhead, and in connection, or not, with structures already erected. Where it is to be placed underground, it may be in the form of a box or longitudinal trough of wood, terra-cotta, metal, or other material, with simple side, top, and bottom pieces, as illustrated in Fig. 2; or, if desired, the bottom piece may be omitted. A similar form of box may be used where the supports are to be applied overhead; but I do not confine myself to any special form of box or frame.

Where the conduit is provided with side walls, as illustrated in the drawings, I prefer to employ the construction illustrated in Figs.

3 and 4, for confining the journals of the shafts on which the grooved pulleys are mounted. In the side walls are provided vertical undercut grooves, to which are adapted the removable keys $f$, which may be in the form illustrated in Fig. 3, or that shown in Fig. 4. At suitable distances apart are formed in the side walls recesses $f'$, which are of a character to form bearings for the journals of the shafts, so that when the keys are removed the shafts with their grooved pulleys can be dropped into position one after the other, the journals being passed through the key-seats into their respective bearings, $f'$, and then confined in position by inserting the keys $f$ into their seats or grooves.

I claim as my invention—

1. A conduit for electrical conductors and cables, said conduit consisting of a frame and two or more sets of grooved pulleys closely adjacent to each other to form openings for confining as well as supporting the conductors or cables, substantially as set forth.

2. The combination of the shafts carrying grooved pulleys for the conductors or cables, with the side walls of the frame having undercut grooves and lateral recesses to form bearings for the journals of the adjacent shafts, and retaining-keys adapted to the said grooves, substantially as set forth.

In testimony whereof I have signed my name to this specification in the presence of two subscribing witnesses.

H. FONDERSMITH.

Witnesses:
WILLIAM F. DAVIS,
HARRY SMITH.